(12) United States Patent
Rockey

(10) Patent No.: US 10,883,403 B2
(45) Date of Patent: Jan. 5, 2021

(54) FLUID TRANSFER CONNECTION INTERFACE DESIGN

(71) Applicant: Cummins Inc., Indianapolis, IN (US)

(72) Inventor: Shawn A. Rockey, Seymour, IN (US)

(73) Assignee: Cummins Inc., Columbus, IN (US)

( * ) Notice: Subject to any disclaimer, the term of this patent is extended or adjusted under 35 U.S.C. 154(b) by 11 days.

(21) Appl. No.: 16/142,517

(22) Filed: Sep. 26, 2018

(65) Prior Publication Data

US 2019/0024559 A1 Jan. 24, 2019

Related U.S. Application Data

(63) Continuation of application No. PCT/US2017/029134, filed on Apr. 24, 2017.

(60) Provisional application No. 62/326,182, filed on Apr. 22, 2016.

(51) Int. Cl.
*F01N 13/00* (2010.01)
*F01N 3/20* (2006.01)
*F16L 19/02* (2006.01)

(52) U.S. Cl.
CPC ........ *F01N 3/2066* (2013.01); *F16L 19/0212* (2013.01); *F16L 19/0231* (2013.01); *F16L 19/0237* (2013.01); *F01N 2610/02* (2013.01); *F01N 2610/14* (2013.01)

(58) Field of Classification Search
CPC .............. F01N 2610/14; F16L 19/0212; F16L 19/0231; F16L 19/0237
See application file for complete search history.

(56) References Cited

U.S. PATENT DOCUMENTS

| 3,591,205 | A |   | 7/1971 | Hamburg |
|-----------|---|---|--------|---------|
| 4,709,726 | A |   | 12/1987 | Fitzgibbons |
| 4,768,538 | A | * | 9/1988 | Mintz ................. E21B 33/0355 |
|   |   |   |   | 137/15.09 |
| 5,110,158 | A | * | 5/1992 | Sabo ..................... F16B 7/0426 |
|   |   |   |   | 285/137.11 |

(Continued)

FOREIGN PATENT DOCUMENTS

| EP | 2455645 | 11/2010 |
|----|---------|---------|
| GB | 191317810 | 1/1914 |
| WO | WO2009095477 | 8/2009 |

OTHER PUBLICATIONS

Search Report and Written Opinion, PCT Appln. No. PCT/US17/029134, dated Jul. 6, 2017, 9 pgs.

(Continued)

*Primary Examiner* — Jonathan R Matthias
(74) *Attorney, Agent, or Firm* — Taft Stettinius & Hollister LLP

(57) ABSTRACT

A diesel exhaust fluid transfer circuit providing a fluid transfer connector for securely connecting a port fitting of a diesel exhaust fluid device to a diesel exhaust fluid hose. The fluid transfer connector comprises an attachment nut attachable to a port fitting of the diesel exhaust fluid device. The fluid transfer connector further comprises a hose adapter including a fluid conduit and an annular wiper seal coaxially aligned with the fluid conduit. With the attachment nut attached to the port fitting, the fluid conduit is slidable over the port fitting and connectable to the attachment nut, and the annular wiper seal wipes any residue on the port fitting as the fluid conduit is slid over the port fitting.

21 Claims, 3 Drawing Sheets

(56) References Cited

U.S. PATENT DOCUMENTS

| | | |
|---|---|---|
| 8,662,909 B2 | 3/2014 | Franke |
| 2010/0018693 A1* | 1/2010 | Duncan .................. E21B 23/08 |
| | | 166/77.2 |
| 2013/0306665 A1 | 11/2013 | Eberhardt et al. |
| 2014/0138568 A1 | 5/2014 | van Vuuren et al. |
| 2014/0290214 A1 | 10/2014 | Heichelbech et al. |
| 2014/0319825 A1 | 10/2014 | Jones et al. |

OTHER PUBLICATIONS

Chinese Office Action from Counter Chinese Application, CN Serial No. 201780024650.1, 9 pgs., dated Jan. 21, 2020.
Translation of Chinese Office Action from Counter Chinese Application, CN Serial No. 201780024650.1, 2 pgs., dated Jan. 21, 2020.

* cited by examiner

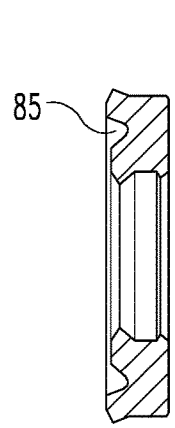
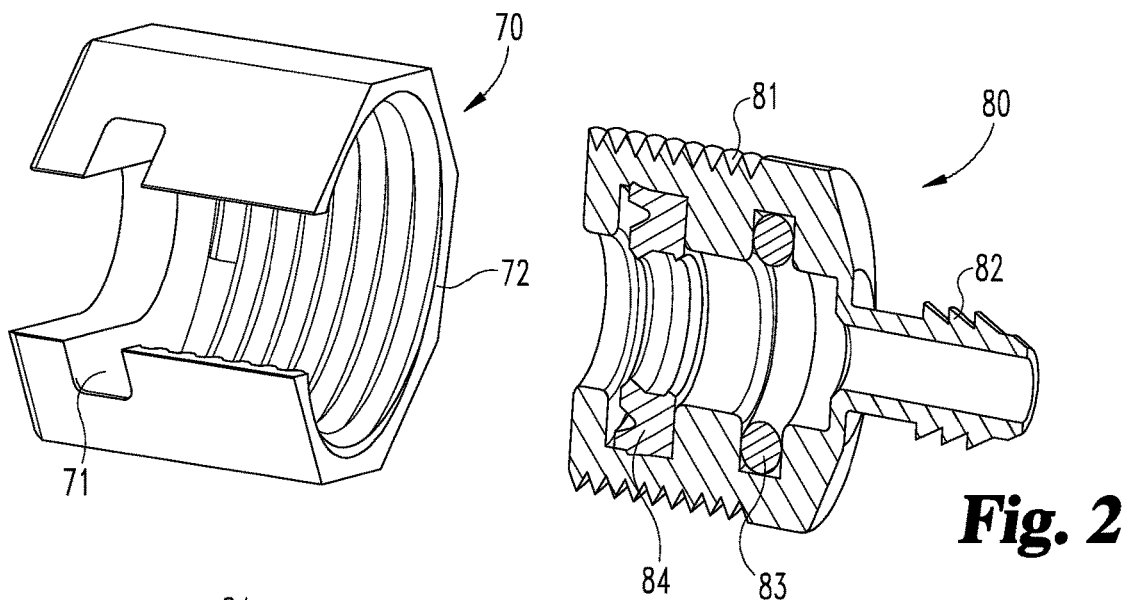
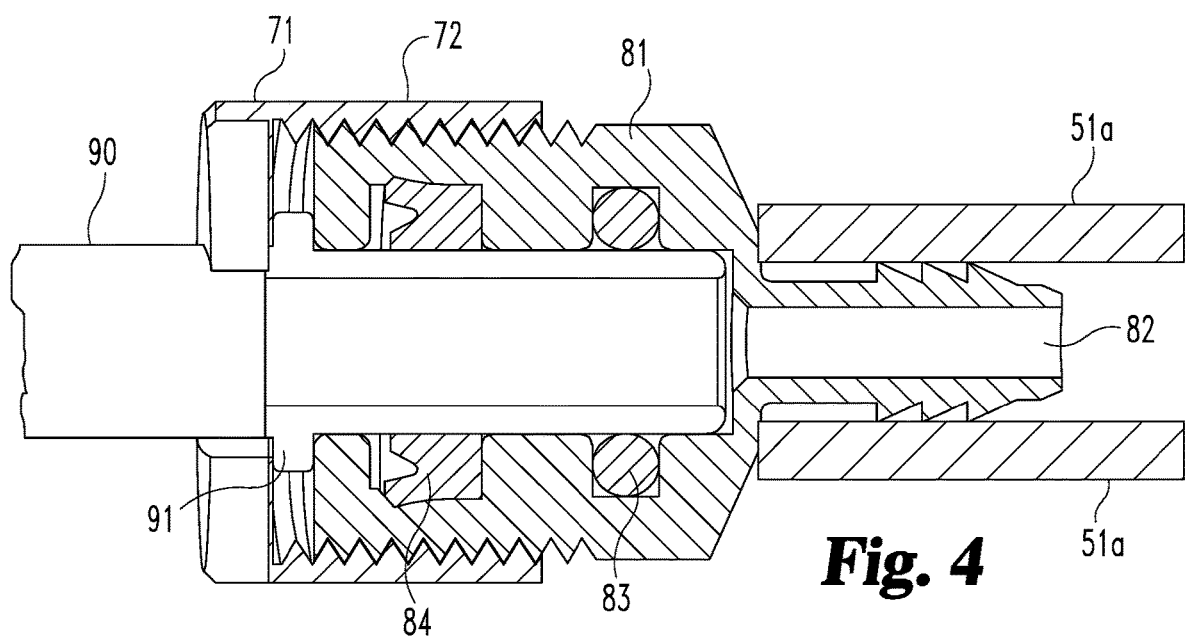

FLUID TRANSFER CONNECTION INTERFACE DESIGN

TECHNICAL FIELD

The present disclosure relates generally to selective catalytic reduction (SCR) technology, and more particularly but not exclusively to diesel fluid exhaust transfer circuits including a doser for injecting diesel exhaust fluid into a SCR system.

BACKGROUND

The purpose of a SCR system is to reduce levels of oxides of nitrogen (NOx) emitted from an engine that are harmful to the environment. More particularly, a SCR system is the aftertreatment technology that treats exhaust gas downstream of the engine whereby the doser is operated to inject specified quantities of diesel exhaust fluid (DEF) into the exhaust upstream of a SCR catalyst that vaporizes and decomposes the DEF to form ammonia ($NH_3$) and carbon dioxide ($CO_2$). The $NH_3$ is desired within the SCR system for converting the NOx to harmless nitrogen ($N_2$) and water ($H_2O$).

Existing efforts to comply diesel fluid exhaust transfer circuits with industry standards, particularly for high horsepower engine markets, suffer from a number of drawbacks, limitations and shortcomings. There remains a significant need for the unique diesel fluid exhaust transfer circuits disclosed herein.

SUMMARY

Unique diesel exhaust fluid transfer circuits providing a fluid transfer connector for securely connecting a port fitting of a diesel exhaust fluid device (e.g., a tank, a pump or a doser) to a diesel exhaust fluid hose. In one embodiment, the fluid transfer connector comprises an attachment nut attachable to a port fitting of the diesel exhaust fluid device. The fluid transfer connector further comprises a hose adapter including a fluid conduit and an annular wiper seal coaxially aligned with the fluid conduit. With the attachment nut attached to the port fitting, the fluid conduit is slidable over the port fitting and connectable to the attachment nut, and the annular wiper seal wipes any residue on the port fitting as the fluid conduit is slid over the port fitting.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

FIG. 2 is a perspective cross-sectional view of a fluid transfer connector of the present disclosure.

FIG. 3 is a cross-sectional view of an annular wiper seal of the present disclosure.

FIG. 4 is a cross-sectional view of the fluid transfer connector of FIG. 2 mounted on a fluid injector.

DESCRIPTION OF ILLUSTRATIVE EMBODIMENTS

Figure 1A:
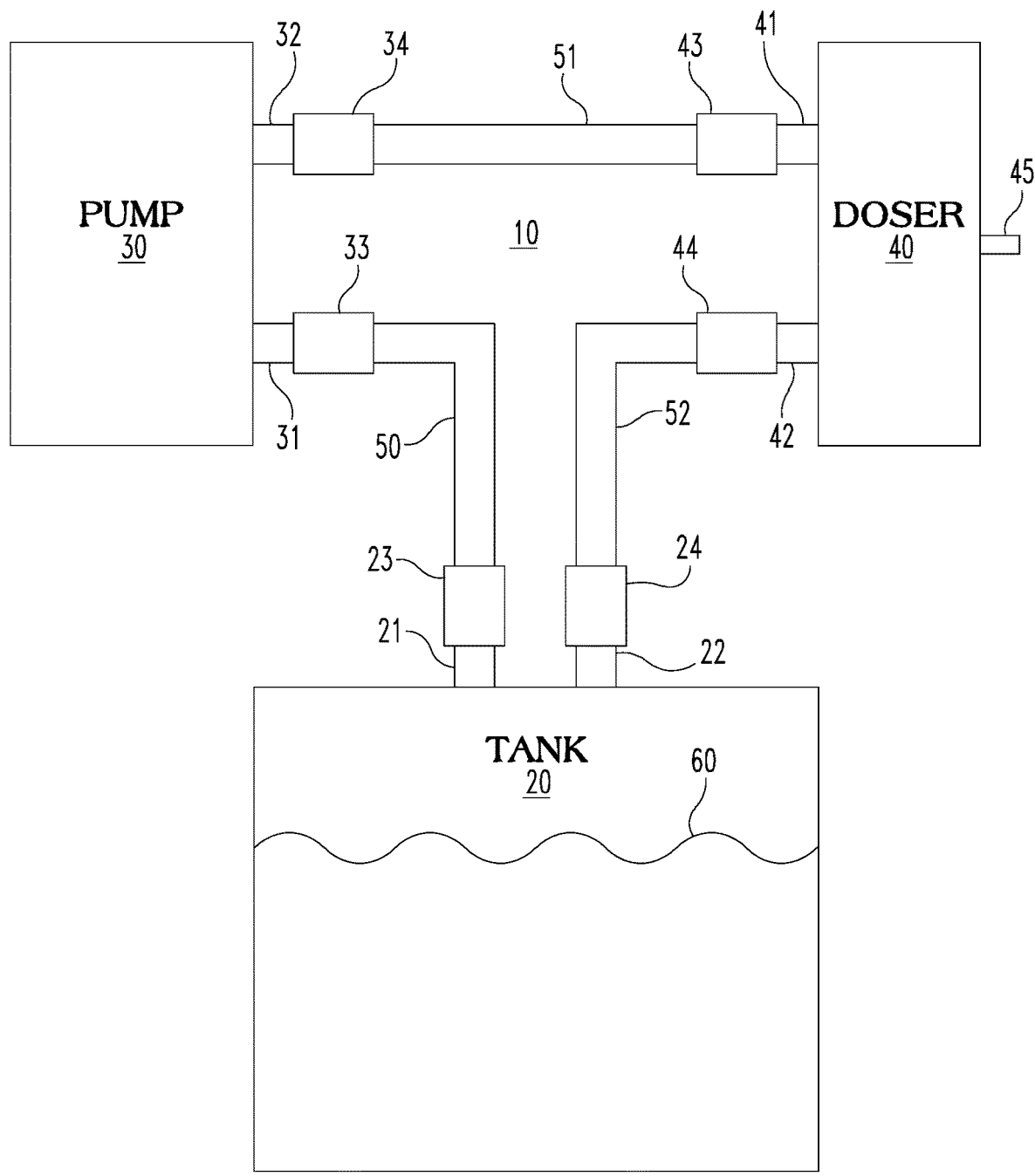
FIG. 1A is a block diagram of a diesel exhaust fluid transfer circuit of the present disclosure absent any fluid flow through the circuit and FIG. 1B is a block diagram of the diesel exhaust fluid transfer circuit of the present disclosure illustrative of a fluid flow through the circuit.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1A, a block diagram of a diesel exhaust fluid transfer circuit 10 of diesel exhaust fluid devices including a tank 20, a pump 30 and a doser 40.

An outlet port fitting 21 of tank 20 is connected via a fluid transfer connector 23, a hose 50 and a fluid transfer connector 33 to an inlet port filling 31 of pump 30.

An outlet port fitting 32 of pump 30 is connected via a fluid transfer connector 34, a hose 51 and a fluid transfer connector 43 to an inlet port fitting 41 of doser 40.

An outlet port fitting 42 of doser 40 is connected via a fluid transfer connector 44, a hose 52 and a fluid transfer connector 24 to an inlet port fitting 22 of tank 20.

Figure 1B:
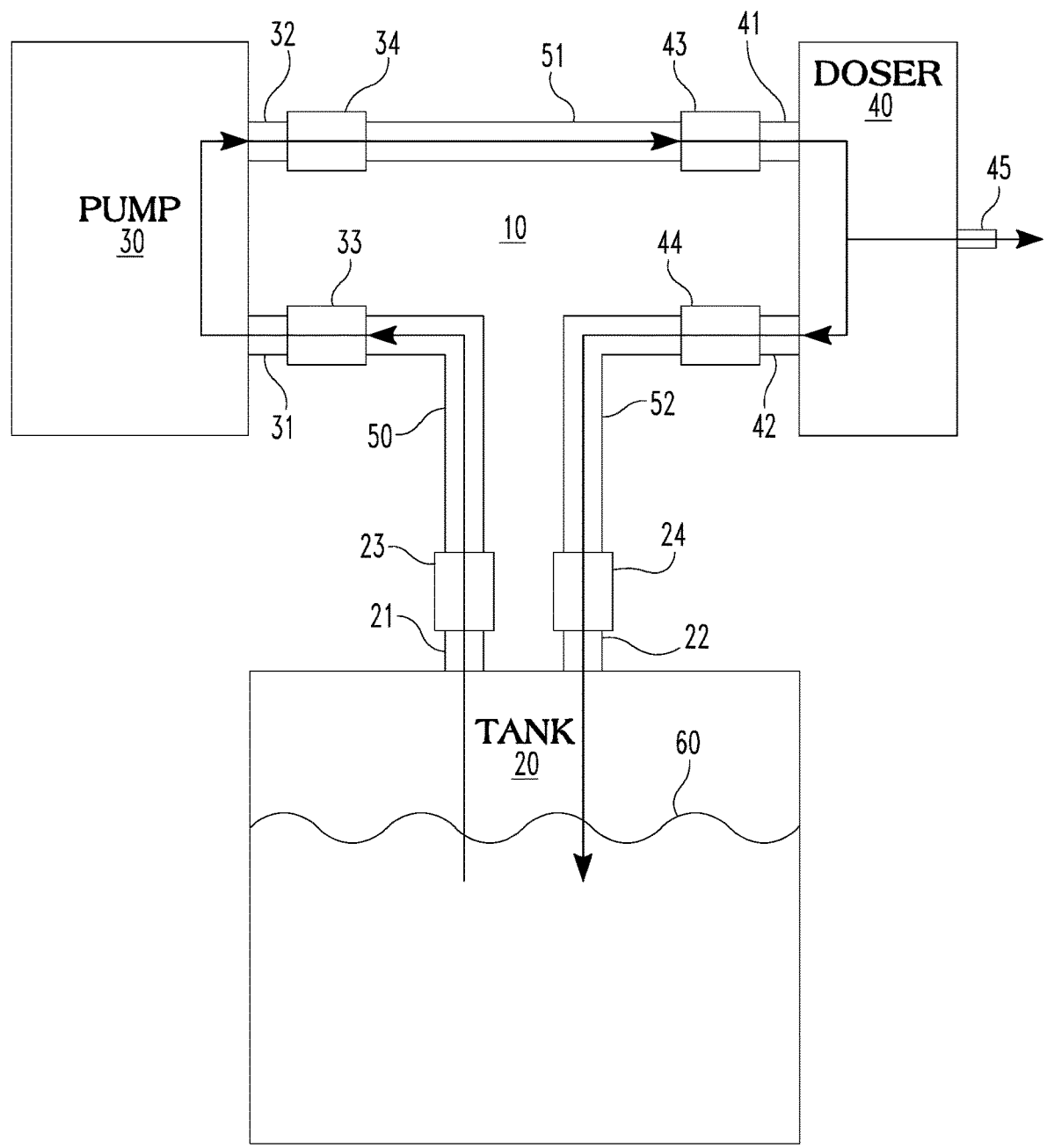

In fluid operation as shown in FIG. 1B, tank 20 contains a diesel exhaust fluid (DEF) 60 serving as a reactant necessary for a functionality of a selective catalytic reduction (SCR) system (not shown). In one embodiment, DEF 60 is a blended aqueous urea solution of 32.5% high purity urea and 67.5% deionized water whereby the urea is a compound of nitrogen that turns to ammonia when heated.

The port fittings and the hoses are configured to facilitate a protected transfer of DEF 60 between tank 20, pump 30 and doser 40. In one embodiment, each port fitting has a standard male configuration that is sized to ensure protection of an associated diesel exhaust fluid device.

The fluid transfer involves pump 30 extracting DEF 60 from tank 20 and applying the extracted DEF 60 at a specified degree of pressure (e.g., 145 psi) to inlet port fitting 41 of doser 40 to maintain doser 40 at a cool operating temperature. Doser 40 is controlled to inject a specified quantity of DEF 60 via an injector 45 into an exhaust catalyst or aftertreatment system (not shown). Any residual DEF 60 remaining in doser 40 upon an injection of DEF 60 into the exhaust catalysis is returned by doser 40 to tank 20.

In practice, fluid transfer connectors 23, 24, 33, 34, 43 and 44 must be compatible with DEF 60, provide a robust seal of the port fittings and be capable of withstanding rigors of a harsh environment, particularly for high horsepower environments.

With reference to FIG. 2, an embodiment of a fluid transfer connector (e.g., fluid transfer connectors 23, 24, 33, 34, 43 and 44 of FIGS. 1A and 1B) includes an attachment nut 70 and a hose adapter 80, both having a stainless steel and/or plastic material composition.

Attachment nut 70 includes a slotted clamp 71 and a threaded ring 72.

Hose adapter 80 includes a fluid conduit formed by a threaded ring 81 and an annular hose interface 82.

Threading ring 81 seats an O-ring seal 83 and a wiper seal 84.

With reference to FIG. 3, wiper seal 84 is an annular ring having an annular flexible groove 85.

With reference to FIG. 4, in assembly, attachment nut 70 is clamped onto a stop 91 of a male port fitting 90. Subsequently, the fluid conduit of hose adapter 80 is slid on to male port fitting 90 and screwed within attachment nut 70 whereby seals 83 and 84 form tight seals with groove 85 of wiper seal 84 expanding to wipe any residue on the exterior surface of male port fitting 90 to facilitate a stronger, longer lasting seal for O-ring 83. Thereafter, a hose (e.g., hose 51a as shown) is interlocked to the fluid conduit of hose adapter 80 via a friction fit over hose interface 82.

Referring back to FIGS. 1A and 1B, the incorporation of one or more fluid transfer connectors within diesel exhaust fluid transfer circuit 10 is very beneficial to the efficient operation of circuit 10. In practice, tank 20, pump 30 and doser 40 may be segregated as shown, or integrated as desired. Furthermore, additional devices may be added to circuit 10 as needed.

As is evident from the figures and text presented above, a variety of aspects of the present invention are contemplated. According to one aspect, a fluid transfer connector comprises an attachment nut attachable to a port fitting of a diesel exhaust fluid device (e.g., an input port fitting or an output port fitting of a tank, a pump or a doser). The fluid transfer connector further comprises a hose adapter including a fluid conduit and an annular wiper seal coaxially aligned with the fluid conduit. With the attachment nut attached to the port fitting of the diesel exhaust fluid device, the fluid conduit is slidable over the port fitting and connectable to the attachment nut whereby the annular wiper seal wipes any residue on the port fitting as the fluid conduit is slid over the port fitting.

According to a second aspect, a diesel exhaust fluid transfer circuit comprises a diesel exhaust device having an output port fitting (e.g., an output port fitting of a tank, a pump or a doser). The circuit further comprises a diesel exhaust fluid hose and a fluid transfer connector.

The fluid transfer connector includes an attachment nut attached to the output port fitting of the diesel exhaust fluid device.

The fluid transfer connector further includes a hose adapter including a fluid conduit slid over the output port fitting, connected to the attachment nut and interlocked with the diesel exhaust fluid hose.

The hose adapter further includes an annular wiper seal coaxially aligned with the fluid conduit for wiping any residue on the output port fitting as the fluid conduit is slid over the output port fitting.

According to a third aspect, a diesel exhaust fluid transfer circuit comprises a diesel exhaust device having an input port fitting (e.g., an input port fitting of a tank, a pump or a doser). The circuit further comprises a diesel exhaust fluid hose and a fluid transfer connector.

The fluid transfer connector includes an attachment nut attached to the input port fitting of the diesel exhaust fluid device.

The fluid transfer connector further includes a hose adapter including a fluid conduit slid over the input port fitting, connected to the attachment nut and interlocked with the diesel exhaust fluid hose.

The hose adapter further includes an annular wiper seal coaxially aligned with the fluid conduit for wiping any residue on the input port fitting as the fluid conduit is slid over the input port fitting.

According to a fourth aspect, a diesel exhaust fluid transfer circuit comprises a first diesel exhaust device having an output port fitting and a second diesel exhaust device having an input port fitting (e.g., a tank-pump pairing, a pump-doser pairing or a doser-tank pairing). The circuit further comprises a diesel exhaust fluid hose and a pair of fluid transfer connectors.

The first fluid transfer connector includes a first attachment nut attached to the output port fitting of the first diesel exhaust fluid device.

The first fluid transfer connector further includes a first hose adapter including a first fluid conduit slid over the output port fitting, connected to the first attachment nut and interlocked with the diesel exhaust fluid hose.

The first hose adapter further includes a first annular wiper seal coaxially aligned with the first fluid conduit for wiping any residue on the output port fitting as the first fluid conduit is slid over the output port fitting.

The second fluid transfer connector includes a second attachment nut attached to the input port fitting of the second diesel exhaust fluid device.

The second fluid transfer connector further includes a second hose adapter including a second fluid conduit slid over the input port fitting, connected to the second attachment nut and interlocked with the diesel exhaust fluid hose.

The second hose adapter further includes a second annular wiper seal coaxially aligned with the second fluid conduit for wiping any residue on the input port fitting as the second fluid conduit is slid over the input port fitting.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A fluid transfer connector, comprising:
   an attachment nut attachable to a port fitting of a fluid device, wherein the fluid device is one of a tank, a pump and a diesel exhaust fluid doser; and
   a hose adapter including a fluid conduit and an annular wiper seal coaxially aligned with the fluid conduit, the hose adapter being formed by a threaded ring and an annular hose interface extending axially from one end of the threaded ring for engagement to a fluid hose, wherein the threaded ring seats the annular wiper seal,
   wherein, with the attachment nut attached to the port fitting, the fluid conduit is slidable over the port fitting and threadingly connects to the attachment nut with the threaded ring, and
   wherein the annular wiper seal wipes any residue on the port fitting as the fluid conduit is slid over the port fitting and the threaded ring is threadingly connected to the attachment nut and the port fitting includes a stop extending outwardly therefrom that is located between the attachment nut and the threaded ring.

2. The fluid transfer connector of claim 1, wherein the fluid conduit is further interlockable with the fluid hose via the annular hose interface.

3. The fluid transfer connector of claim 1, wherein the attachment nut includes a slotted clamp configured to clamp onto a stop of the port filling of the fluid device.

4. The fluid transfer connector of claim 1,
wherein the attachment nut includes a first threaded ring, and
wherein the fluid conduit includes a second threaded ring screwable within the first threaded ring.

5. The fluid transfer connector of claim 1, wherein the hose adapter further includes an o-ring coaxially aligned with the fluid conduit.

6. A fluid transfer circuit, comprising:
a first fluid device having an output port fitting, wherein the first fluid device is one of a tank, a pump and a diesel exhaust fluid closer;
a fluid hose; and
a first fluid transfer connector including:
a first attachment nut attached to the output port fitting of the first fluid device,
a first hose adapter including a first fluid conduit, the first fluid conduit being formed by a first threaded ring and an annular hose interface extending axially from one end of the first threaded ring, wherein the first fluid conduit is slid over the output port fitting, connected to the first attachment nut with the first attachment nut attached to the first fluid device and interlocked with the fluid hose, and
the first hose adapter further including a first annular wiper seal that is seated by the first threaded ring and is coaxially aligned with the first fluid conduit for wiping any residue on the output port fitting as the first fluid conduit is slid over the output port fitting and the first threaded ring is threadingly connected to the first attachment nut,
wherein the output port fitting includes a stop extending outwardly therefrom that is located between the attachment nut and the threaded ring.

7. The fluid transfer circuit of claim 6, wherein the first attachment nut includes a slotted clamp configured to clamp onto a stop of the output port filling of the first fluid device.

8. The fluid transfer circuit of claim 6,
wherein the first attachment nut includes a second first threaded ring, and
the first threaded ring screwable within the second threaded ring.

9. The fluid transfer circuit of claim 6, wherein the first hose adapter further includes an o-ring coaxially aligned with the first fluid conduit.

10. The fluid transfer circuit of claim 6, further comprising:
a second fluid device having an input port fitting; and
a second fluid transfer connector including:
a second attachment nut attached to the input port fitting of the second fluid device,
a second hose adapter including a second fluid conduit slid over the input port fitting, connected to the second attachment nut and interlocked with the fluid hose, and
the second hose adapter further including a second annular wiper seal coaxially aligned with the second fluid conduit for wiping any residue on the input port fitting as the second fluid conduit is slid over the input port fitting.

11. The fluid transfer circuit of claim 10, wherein the second attachment nut includes a slotted clamp configured to clamp onto a stop of the input port filling of the second fluid device.

12. The fluid transfer circuit of claim 10,
wherein the second fluid conduit is screwable within the second attachment nut.

13. The fluid transfer circuit of claim 10, wherein the second hose adapter further includes an o-ring coaxially aligned with the second fluid conduit.

14. A fluid transfer circuit, comprising:
a fluid device having an input port fitting, wherein the fluid device is one of a tank, a pump and a diesel exhaust fluid closer;
a fluid hose; and
a fluid transfer connector including:
an attachment nut attached to the input port fitting of the fluid device,
a hose adapter including a fluid conduit, the fluid conduit being formed by a threaded ring and an annular hose interface extending axially from one end of the threaded ring, wherein the fluid conduit is slid over the input port fitting for connection to the attachment nut and interlocked with the fluid hose, and
the hose adapter further including an annular wiper seal that is seated by the threaded ring and is coaxially aligned with the fluid conduit for wiping any residue on the input port fitting as the fluid conduit is slid over the input port fitting and the threaded ring is threadingly connected to the attachment nut, wherein the input port fitting includes a stop extending outwardly therefrom that is located between the attachment nut and the threaded ring.

15. The fluid transfer circuit of claim 14, wherein the attachment nut includes a slotted clamp configured to clamp onto a stop of the input port filling of the fluid device.

16. The fluid transfer circuit of claim 14, wherein the hose adapter further includes an o-ring coaxially aligned with the fluid conduit.

17. The fluid transfer connection of claim 1, wherein at least one of the attachment nut and the hose adapter are made from stainless steel.

18. The fluid transfer connection of claim 1, wherein each of the attachment nut and the hose adapter are made from stainless steel.

19. A fluid transfer device, comprising:
a fluid hose and a fluid transfer connector connected to the fluid hose, the fluid transfer connector including:
a hose adapter secured to the fluid hose, the hose adapter including a fluid conduit formed by a threaded ring and an annular hose interface extending axially from one end of the threaded ring;
an attachment nut engaged about the hose adapter opposite the fluid hose, the attachment nut further engageable to a male port fitting;
an annular wiper seal that is seated by the threaded ring of the hose adapter, the annular wiper seal configured to expandingly engage the male port fitting positioned in the hose adapter as the threaded ring is threadingly engaged to the attachment nut; and
an O-ring seal within the threaded ring of the hose adapter configured to sealing engage the male port fitting in the hose adapter,
wherein the threaded ring of the hose adapter is threadingly engaged within the attachment nut,
wherein the male port fitting includes a stop extending outwardly therefrom that is located between the attachment nut and the threaded ring.

20. The fluid transfer device of claim 19, wherein at least one of the attachment nut and the hose adapter are made from stainless steel.

21. The fluid transfer device of claim 19, wherein each of the attachment nut and the hose adapter are made from stainless steel.

* * * * *